United States Patent [19]

Doi

[11] Patent Number: 5,467,181

[45] Date of Patent: Nov. 14, 1995

[54] IMAGE FORMING SYSTEM

[75] Inventor: Jun Doi, Kawasaki, Japan

[73] Assignee: Ricoh Company, Ltd., Tokyo, Japan

[21] Appl. No.: 319,716

[22] Filed: Oct. 7, 1994

[30] Foreign Application Priority Data

Oct. 8, 1993 [JP] Japan .................................. 5-252952

[51] Int. Cl.$^6$ .................................................. G03G 21/14
[52] U.S. Cl. ........................................... 355/319; 355/209
[58] Field of Search ..................................... 355/319, 313, 355/309, 308, 208, 209

[56] References Cited

U.S. PATENT DOCUMENTS 5,241,397  8/1993  Yamada .............................. 355/319 X Primary Examiner—R. L. Moses
Attorney, Agent, or Firm—Oblon, Spivak, McClelland, Maier & Neustadt

[57] ABSTRACT

An image forming system in which an image reading device, image forming device and duplex device are operated in a suitable combination to execute a page printer function, copier function and other particular functions based on respective applications. An application in charge of the page printer function sends a request for the duplex device to a system control layer, including a system controller, if the duplex unit is idle when the application has fully formatted image data to be output on both sides of a sheet in a bit map. When the right to use the duplex unit is granted to the application sent the request, the application sends a front print command to the system controller with the result that an image is formed on the front of a sheet by the image forming device. When the sheet carrying the image on one side thereof is fully received in the duplex device, the application sends a rear print command to the system controller. As soon as the sheet begins to be refed from the duplex device, the application releases the right to use the duplex device.

8 Claims, 13 Drawing Sheets

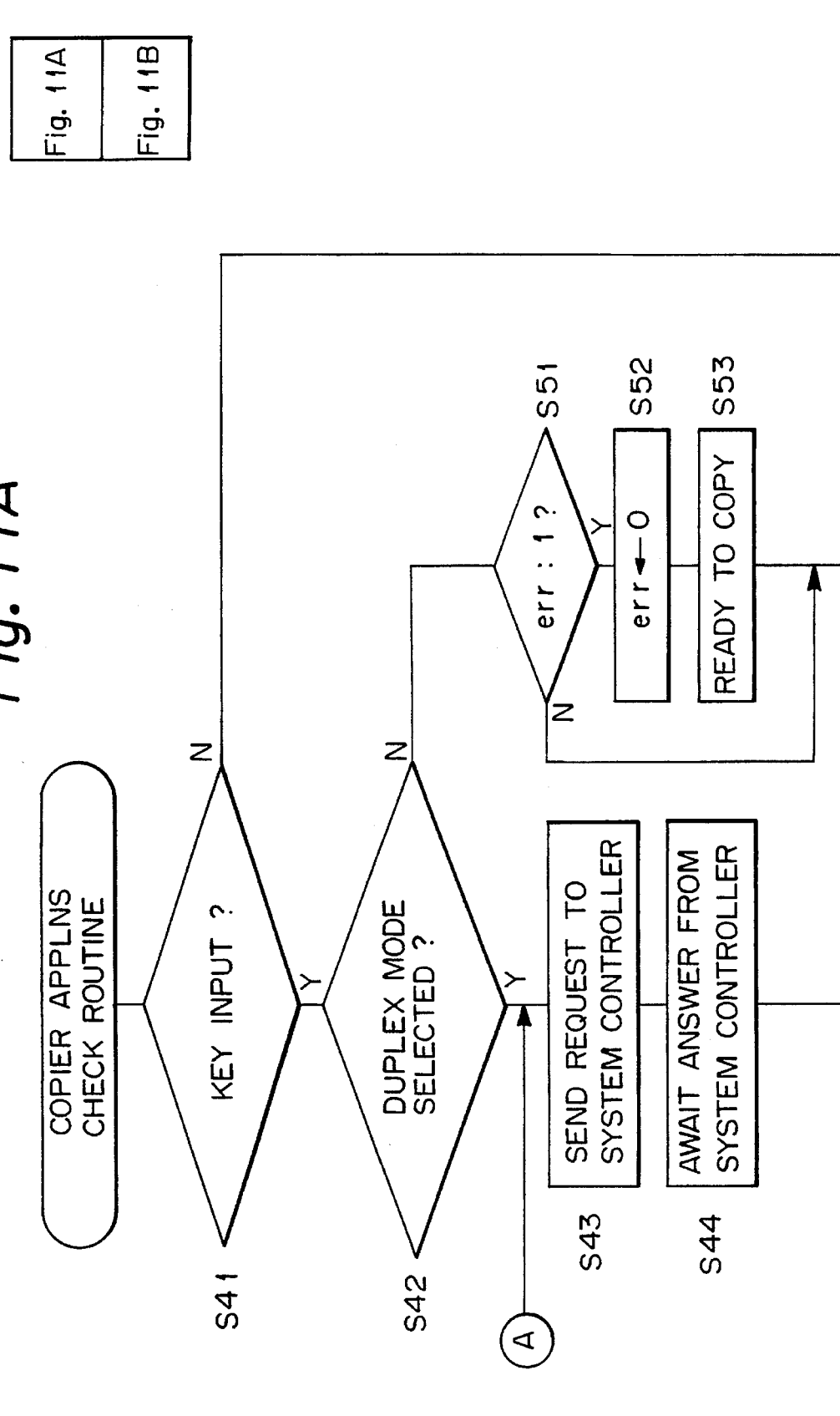

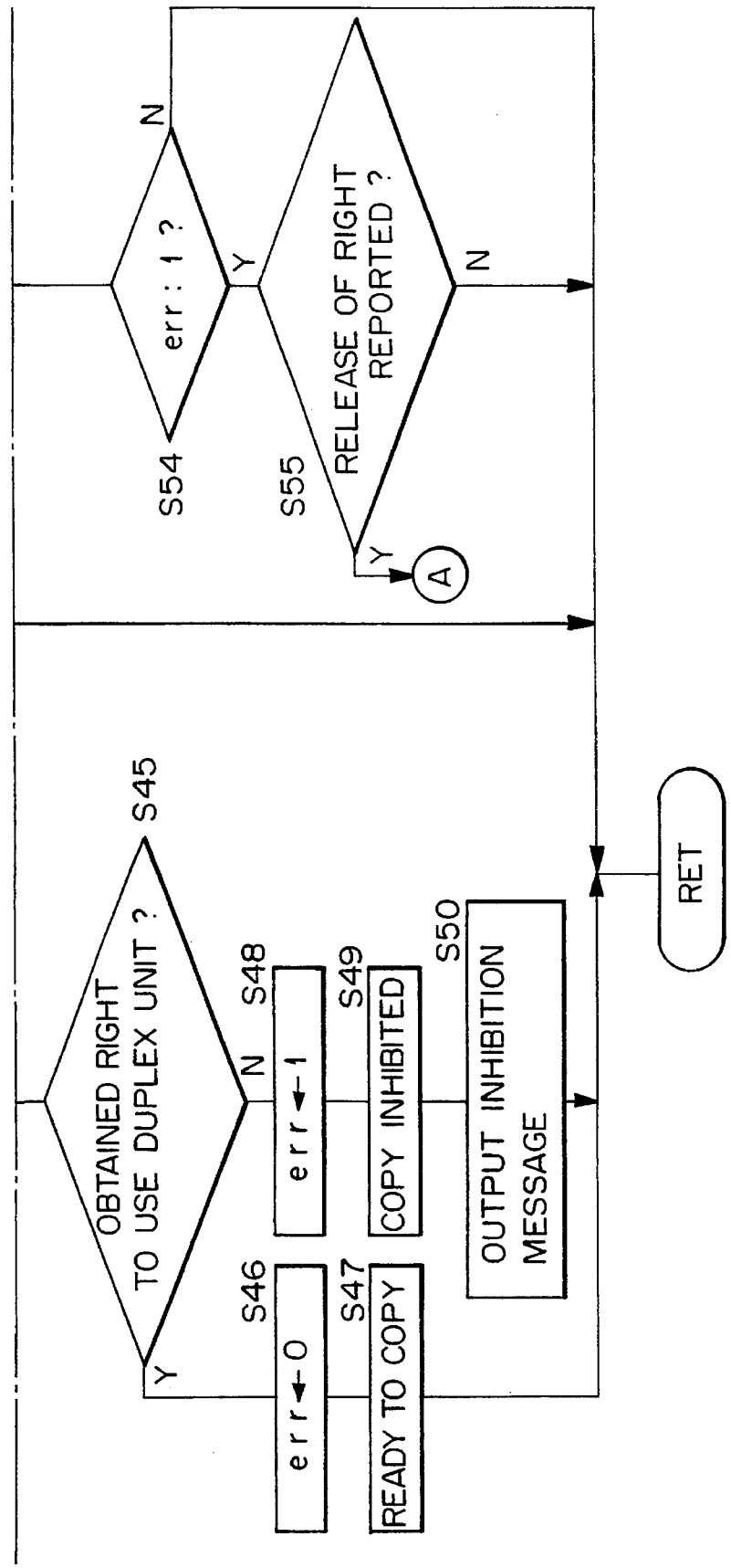

IMAGE FORMING SYSTEM

BACKGROUND OF THE INVENTION

The present invention relates to an image forming system in which an image reading device, image forming device and duplex device are operated a desired combination so as to implement a page printer function, copier function and other functions based on respective applications.

A digital copier extensively used today is an image forming system including an image reading device, image forming device, and duplex device. The image reading device reads a document printed on a document. The resulting image data from the image reading device or image data sent to the system from a host arc applied to the image forming device. The image forming device formats such data in a bit map and outputs them on a sheet. In a duplex mode for forming an on both sides of a sheet, the duplex device image feeds a sheet carrying an image on one side thereof again to the image forming device while turning it over, so that another image may be formed on the other side of the same sheet. With this kind of system, it is possible to construct not only a copier but also a page printer, facsimile apparatus, scanner, electronic file and so forth if the above-mentioned devices are operated in a desired combination. Some advanced digital copiers are loaded with applications for executing such various functions, as needed.

When the image forming system is loaded with a plurality of applications for realizing the functions of various office automation equipment, the applications can share a single resource. Such a system saves cost and space, compared to the installation of individual equipment.

However, the problem with the conventional digital copier or similar image forming system is that it executes single task type system control, i.e., prevents a plurality of applications from executing respective jobs at the same time. Specifically, when a plurality of applications share a single resource, it it likely that a conflict occurs between the applications as to the right to use the resource. Hence, it is impossible with the conventional system to perform multitask type system control which allows two or more applications to execute jobs at the same time.

SUMMARY OF THE INVENTION

It is, therefore, an object of the present invention to provide an image forming system which implements multitask type system control in the event of a conflict between a plurality of applications as to the right to use resources, particularly a duplex device, thereby reducing a waiting time in a duplex mode.

An image forming system of the present invention comprises an image reading device for reading a document image, an image forming device for outputting, in a bit map format, image data from the image reading device or image data from a host, a duplex device for turning over a sheet carrying an image formed by the image forming device on one side thereof, and for refeeding the sheet to the image forming device in order to form an image on the other side thereof, a system controller for controlling a plurality of applications which respectively execute particular functions, including at least a page printer function and a copier function, by suitably combining the devices, and for controlling the devices in response to requests from the plurality of applications, and a requesting device for requesting of the system the a right to use the duplex device when the application in charge of the page printer function has fully formatted the image data to be output on both sides of the sheet in a bit map.

BRIEF DESCRIPTION OF THE DRAWINGS

The above and other objects, features and advantages of the present invention will become more apparent from the following detailed description taken with the accompanying drawings in which:

FIG. 11 is a flowchart indicative of a similar check routine which a copier application also shown in FIG. 2 executes.

DESCRIPTION OF THE PREFERRED EMBODIMENT

Figure 1:
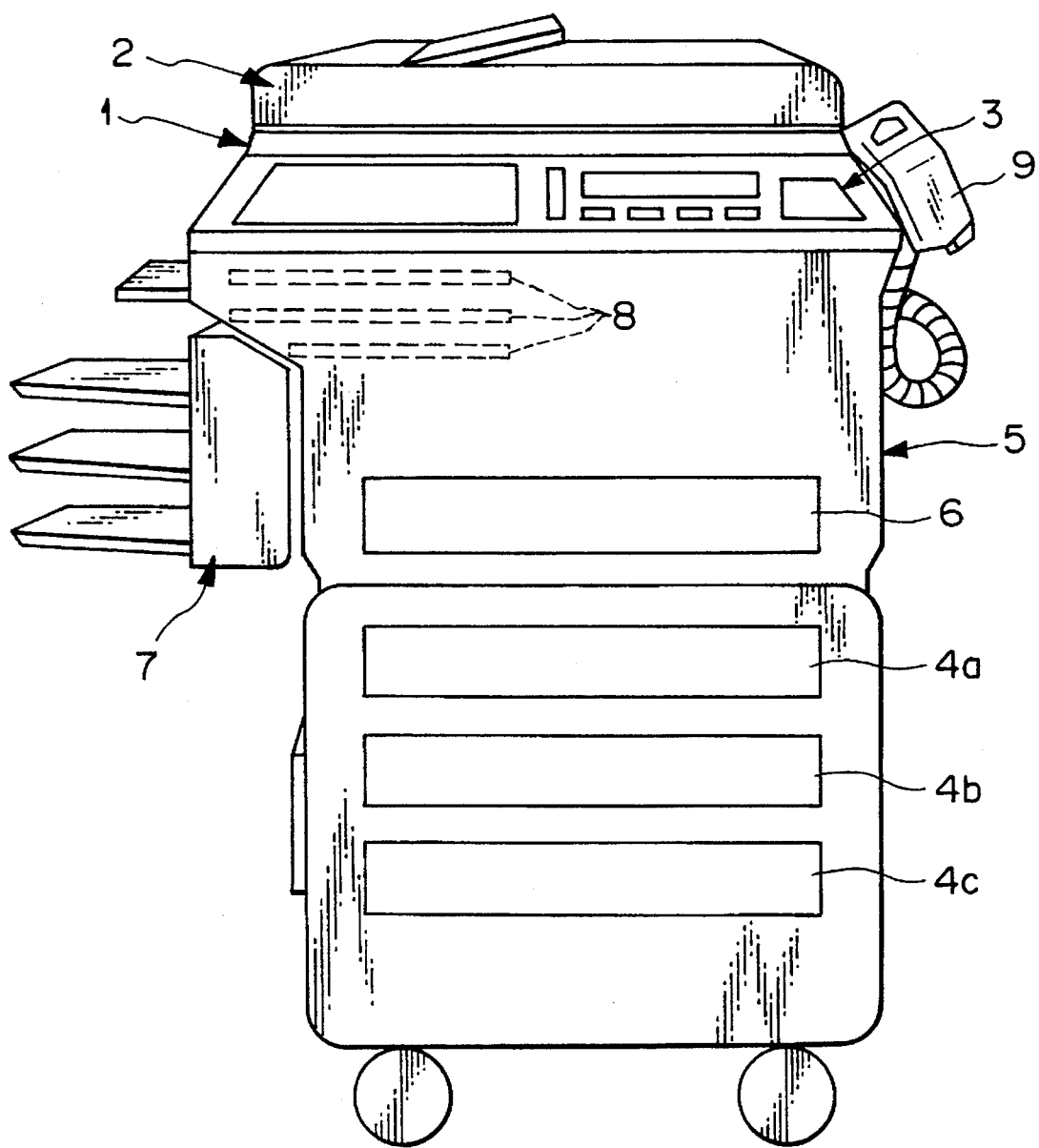
FIG. 1 is an elevation showing the general construction of an image forming system embodying the present invention and implemented as a digital copier.

An image forming system embodying the present invention and implemented as a digital copier by way of example will be described hereinafter. To begin with, essential terms which appear in the following description will be defined.

(1) Image Reading Device

An image reading device for use with a digital copier illuminates a document set thereon, transforms the resulting reflection from the document into an electric signal by a CCD (Charge Coupled Device) image sensor, or solid state imaging device, and then executes necessary image processing with the electric signal.

(2) Image Forming Device

An image forming device built in a digital copier forms the document image represented by the electric signal on a plain sheet, thermosensitive sheet or similar sheet by electrophotographic means, thermosensitive means, thermal transfer means, ink jet means or similar conventional means.

(3) Application

A digital copier is characterized in that it reads a document by the image reacting device while transforming it into an electric signal, and reproduces the document image based on the electric signal by the image forming device. Hence, by changing the electric in signal various ways, it is possible to execute particular functions including a copier function, printer function, facsimile function, scanner function, and file function. A print board loaded with software for executing such functions will hereinafter be referred to as applications.

(4) Video Signal

An electric signal output from the image reading device and representative of an image, an electric signal input to the image forming device and representative of an image, and synchronizing signals will be collectively referred to as video signals.

(5) Control Signal or Command

To interchange video signals between the image reading device, image forming device and applications, it is necessary for such devices to interchange information. Means for so interchanging information will be represented by a control signal or a command.

(6) System and System Controller

Let a digital copier loaded with a plurality of applications and allowing them to share a single resource be referred to as a system. A system controller controls such a system.

(7) Foreground Application

An operation and display section available with a digital copier is often limited although the copier may be loaded with a plurality of applications. In such a case, the operation and display section has to be vacated for an application desired by a user. The application to which the right to use the section is handed over will be called a foreground application. All the key inputs are reported from the system controller to the foreground application. A virtual picture assigned to the foreground application appears on a display included in this section.

(8) Background Application

A background application refers to an application not having the right to use the display. However, even the background application does not have to interrupt the operation thereof. For example, assume that an application for executing a printer function, i.e., a printer application is a background application. Then, if the image forming device is not occupied and image data is received from a host, it is possible for the printer application to format the image data in a bit map and output them on a sheet. The system controller informs the background application of only limited key inputs and allows them to appear in a virtual picture assigned to the background application.

(9) Idle State

When the image forming apparatus is not occupied, as mentioned above, it is considered as being in an idle state. The system controller controls the idle state resource by resource.

(10) Virtual Picture

A picture assigned to each application will be called a virtual picture. Hence, although a plurality of virtual pictures exist, only one of them appears on the display.

(11) Start-Up Application

Let the application to which the display right is granted by the system controller when a power source is turned on be referred to as a start-up application.

(12) Resource

Functional units to be shared by a plurality of applications are each referred to as a resource. The system controller controls the system on a resource basis. In a digital copier to be described, the resources include an image reading device, image forming device, operation and display panel, memories, and peripherals (automatic document feeder, sorter, duplex unit, etc.).

(13) Interleave

The word "interleave" will be mainly used in relation to an image outputting operation. Usually, while a sequence of image outputting cycles having the same purpose (single job) is under way, another sequence is not executed. For example, an advanced digital copier has multiple functions, e.g., a copier function and facsimile function (or printer function). However, even such a copier executes, in most cases, the printer function after the copier function has been completed. The word "interleave" refers to inserting one job for outputting images while another image outputting job is under way. For example, while images are output by the copier function, images may be output by the printer function without the interruption of mechanical operation,

(14) Mode

The word "mode" indicates a condition wherein a particular mode has the right to occupy the display. For example, when the printer application has the display right, the copier is assumed to be in a printer mode.

(15) Mode Transition

The point at which the mode is switched over is referred to as a mode transition and controlled by the system controller.

(16) User-Oriented Setting

When the system is complicated, it is necessary to orient the system to each user. Since not all of the users' needs can be met at the time of shipment, some measures are necessary on the market. It has been customary with an image forming system to install a non-volatile memory so as to implement particular selling meeting the user's need. This kind of function will be referred to as user-oriented setting.

(17) VR or MR

In an image forming apparatus of the type writing data with a laser beam and using an electrophotographic process, the writing density is variable over a certain range. This kind of function will be called a VR (Variable Resolution) or MR (Multi Resolution) function.

(18) User Limitation

Since a copier using an electrophotographic process, among others, involves many expendable supplies, it is often desired to limit the persons who can use the copier. To limit and manage the users, use is made of coin racks, key counters, code numbers, etc.

Referring to FIG. 1 of the drawings, a digital copier embodying the present invention is shown. As shown, the copier has an image reading device 1 for reading a document, an automatic document feeder (ADF) 2 for feeding a stack of documents one by one to the reading surface (glass platen) of the device 1, and an operation and display panel 3 including key switches for entering desired information and a display for displaying information. Sheet cassettes 4a–4c are each loaded with a stack of sheets of particular size. An image forming device receives image data from the image reading device 1 or image data from a host, formats them in a bit map, and then forms an image on a sheet fed from any one of the cassettes 4a–4c.

A duplex unit 6 turns over a sheet carrying an image formed by the image forming device 5 on one side thereof and again feeds it to the image forming device 5, so that an image may be formed on the other side of the same sheet. A sorter 7 distributes sheets sequentially coming out or the image forming device 5 to bins thereof while sorting them. Applications each executes a particular function, i.e., a page printer function, copier function or facsimile (FAX) function by suitably combining the above-stated devices or resources. A system controller controls the resources in response to requests from the applications 8. The copier further includes a telephone handset 9 and a FAX transmit/receive section.

Figure 2:
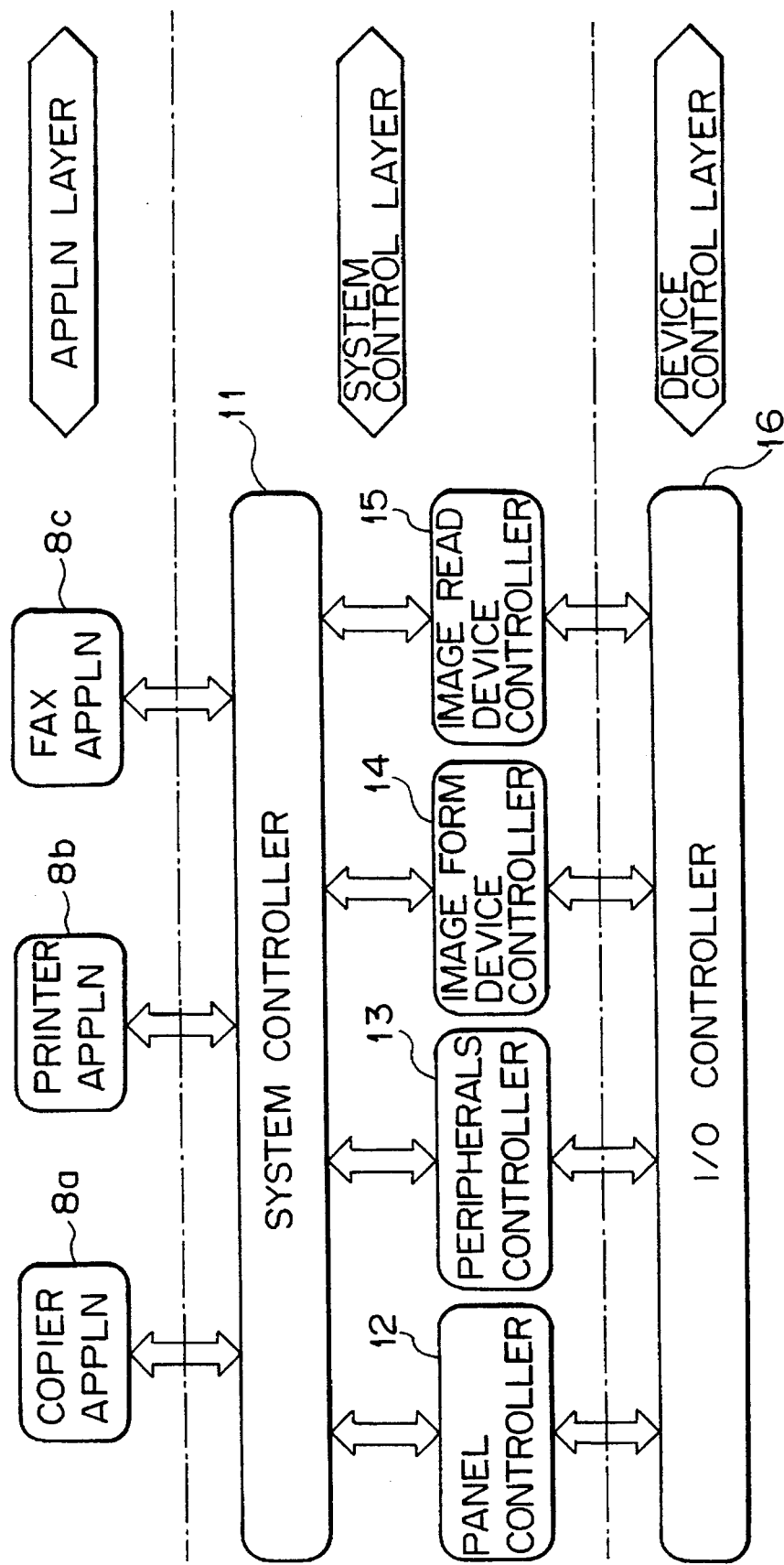
FIG. 2 is a block diagram schematically showing a specific software architecture included in the embodiment.

FIG. 2 shows a specific software architecture for controlling the digital copier. As shown, the software is generally made up of an application layer, system control layer, and device control layer. The system control layer has a system controller 11, a panel controller 12, a peripherals (ADF 2, duplex unit 6 and sorter 7) controller 13, an image forming device controller 14, an an image reading device controller 15. The device control layer is implemented by an input/output (I/O) controller 16 for receiving signals from sensors and sending signals to clutches, motors and other units, i.e., for actually operating such units in response to commands, control signals and other logical instructions from the system control layer. The application layer has a copier application (abbreviated as APPL'N) 8a, a printer application 8b, and a FAX application 8c.

Figure 3:
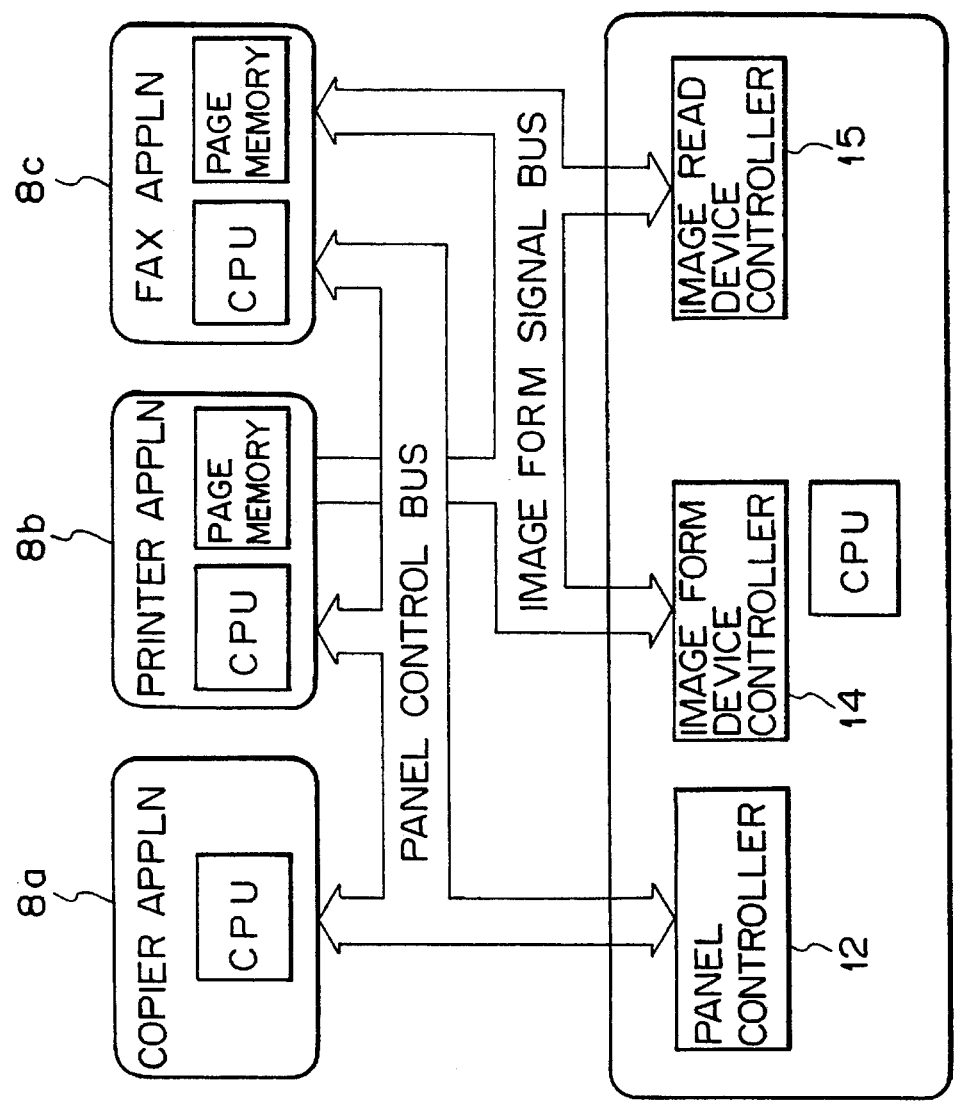
FIG. 3 is a block diagram schematically showing a specific hardware architecture also included in the embodiment.

A specific hardware architecture for control ling the digital copier is shown in FIG. 3. As shown, the applications 8a–8c constituting the application layer are each provided with a respective microcomputer, or CPU (Central Processing Unit) as referred to hereinafter. The system control layer and device control layer, including the panel controller 12, image forming apparatus controller 14 and image reading device controller 15, are implemented by a single CPU.

Figure 4:
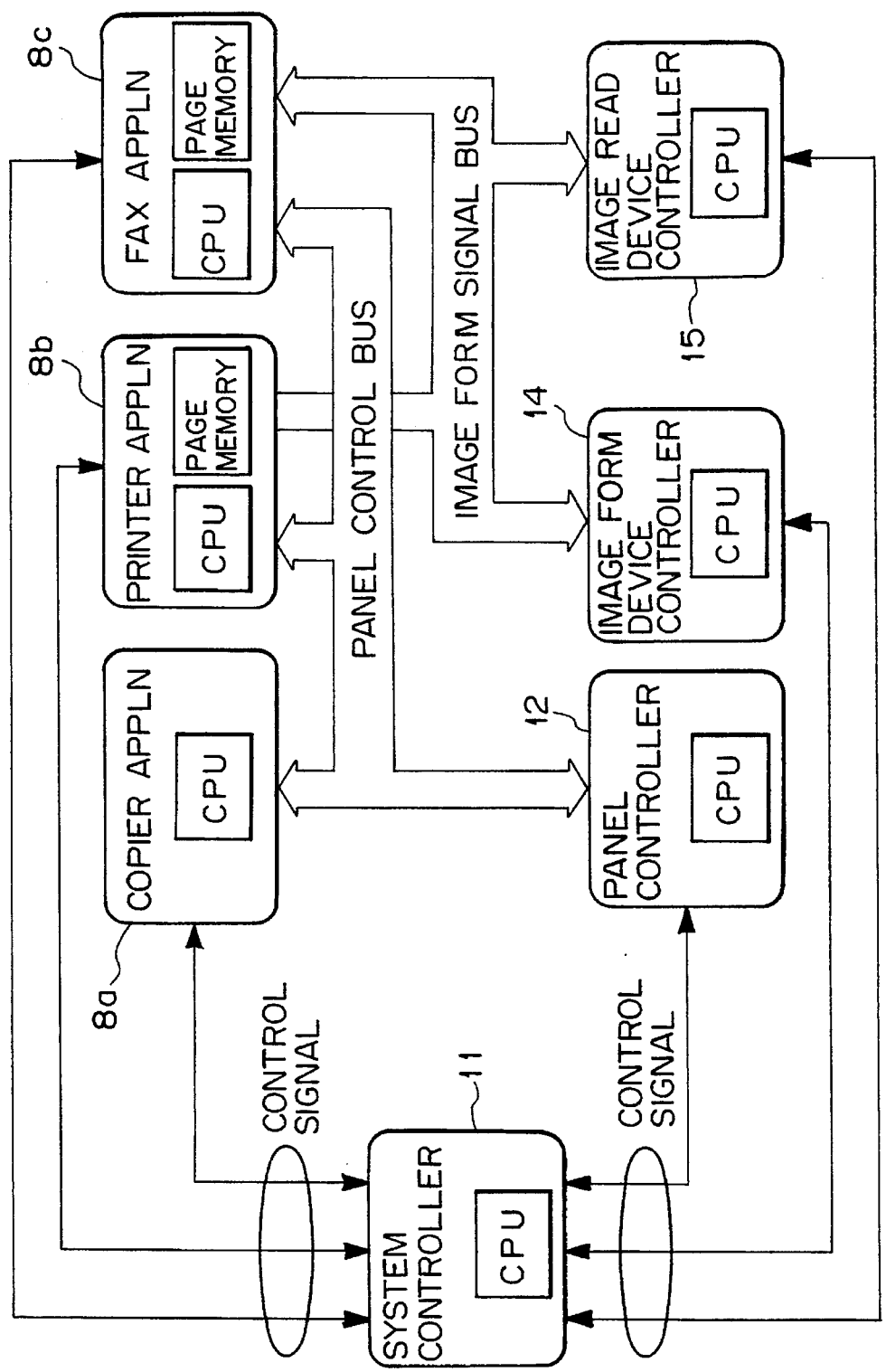
FIG. 4 is a schematic block diagram showing another specific hardware architecture with which the embodiment is practicable.

Another specific hardware arrangement applicable to the embodiment is shown in FIG. 4. As shown, the applications 8a–8c included in the application layer and the system controller 11, panel controller 12, image forming device controller 14, image reading device controller 15 and other controllers included in the system control layer and device control layer are each provided with a respective CPU. The system controller 11 interchanges commands with the applications 8a–8c and controllers over respective control signal lines.

The control to be executed by the system control layer, device control layer and application layer is as follows.

Figure 5:
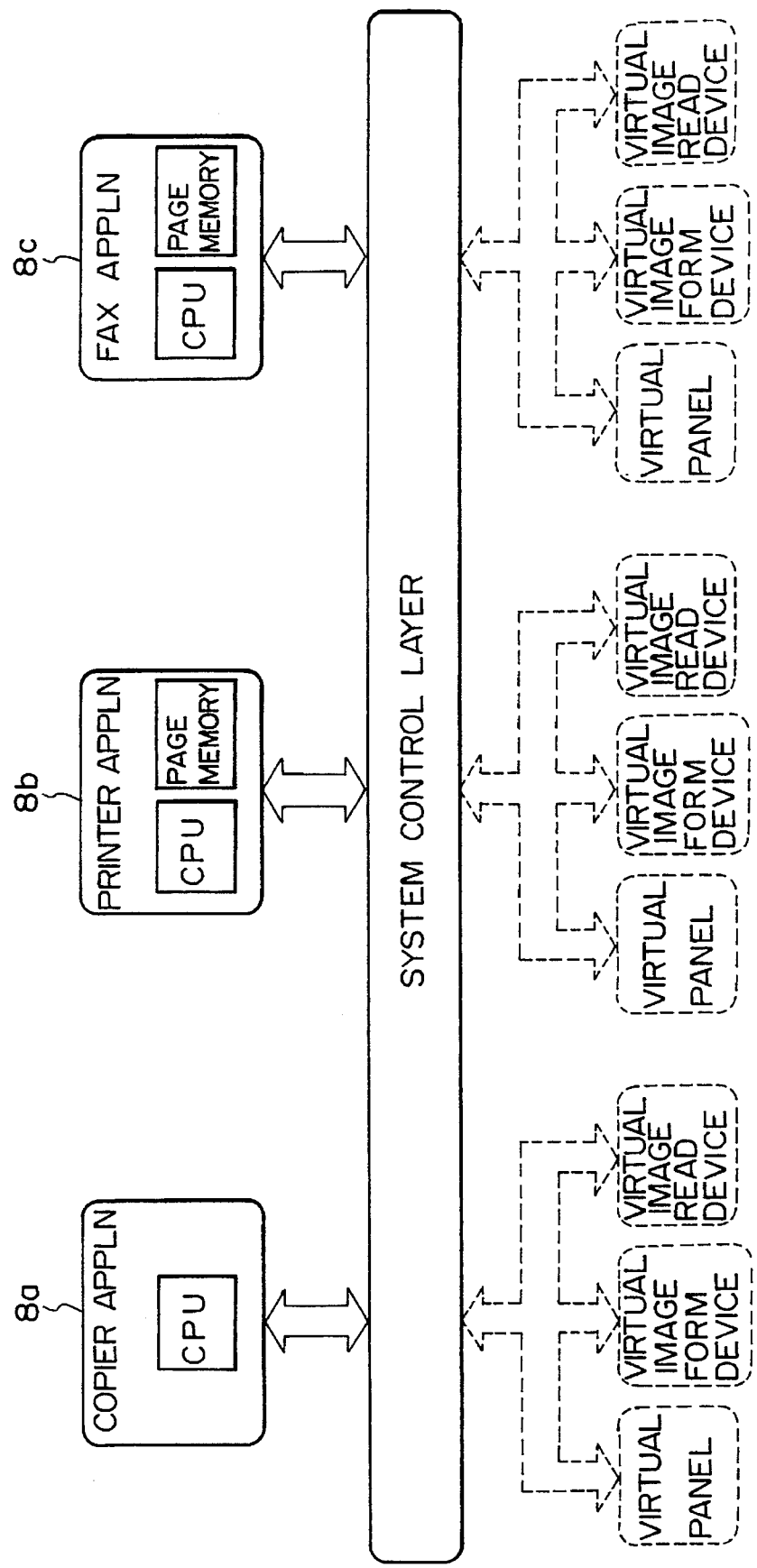
FIGS. 5, 6 and 7 demonstrate specific control to be executed by a system control layer, device control layer and application control layer included in the embodiment.

As shown in FIG. 5, the system control layer assigns virtual resources, i.e., a virtual operation and display panel, virtual image forming device and virtual image reading device to each of the applications 8a–8c, as seen from the application layer side. This makes it needless for the application layer to manage the system conditions and allows the system control layer to control all the applications under the same condition. Specifically, the applications 8a–8c each sends, when needing any of the resources, a request for the right to use them to the system controller 11. In response, the system control layer returns a result of decision on the occupancy of the resources to the application sent the request. Then, the application determines whether or not it can execute the function thereof and executes it if possible. Basically, the system controller manages the execution right in the same procedure.

The numbers of resources available with the digital copier system are only one each. Hence, when the requests for the virtual resources from a plurality of applications conflict, the system control layer has to effect exclusive control or time division allocation control in order to hand over the right to use the actual resources. Which of such two different control schemes should be used depends on the kind of the resource and the user-oriented setting.

Figure 6:
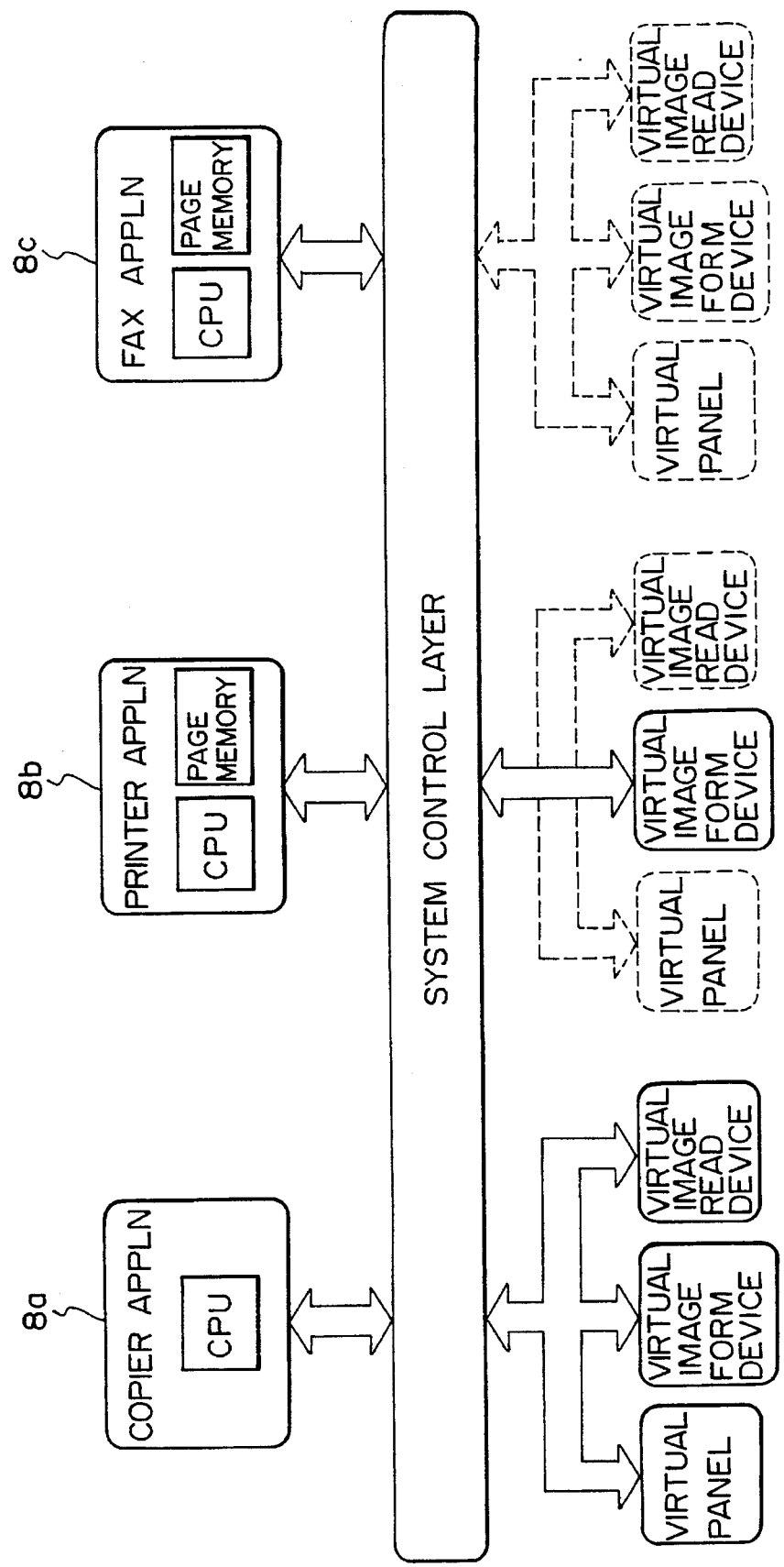
Figure 7:
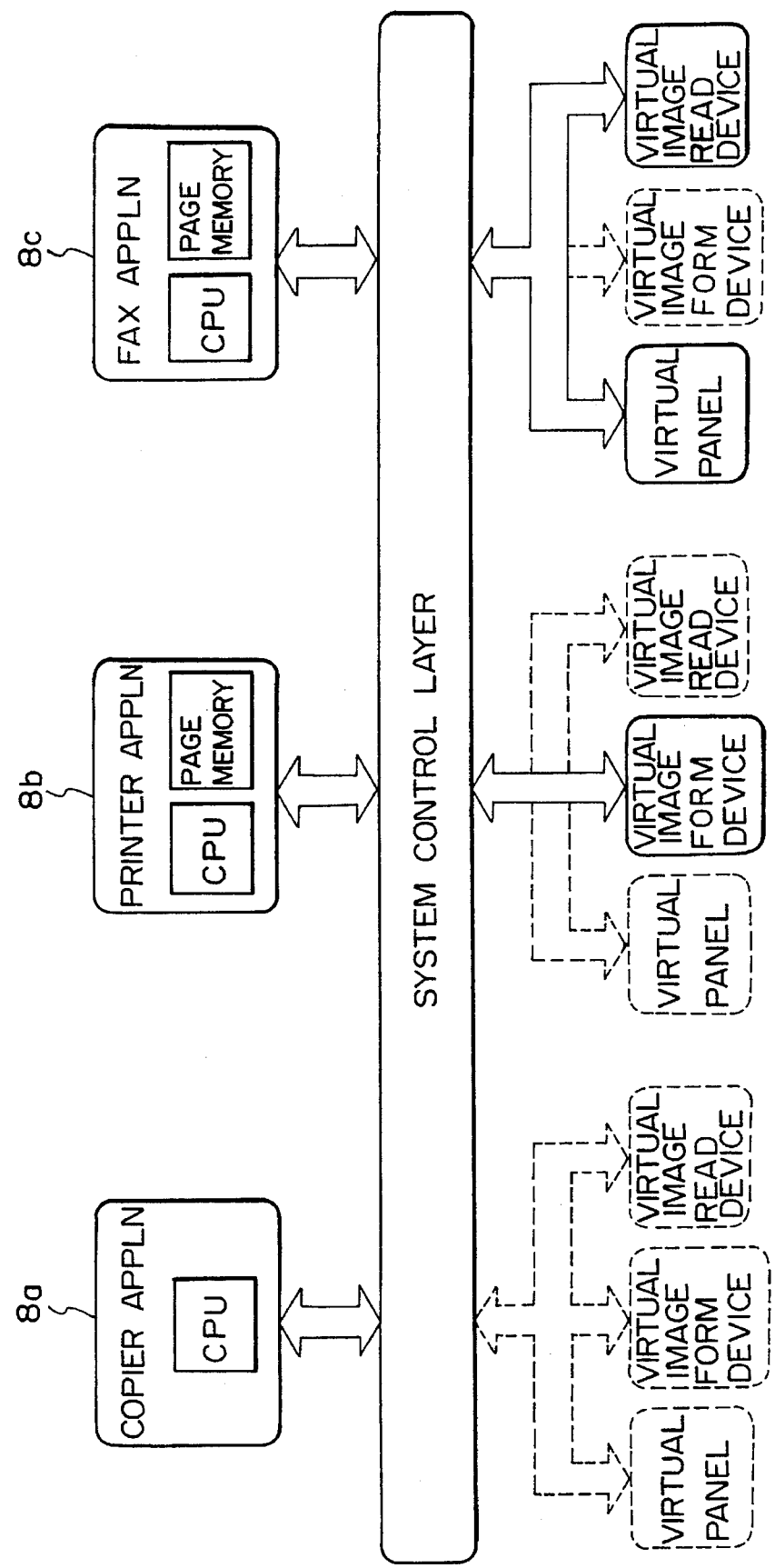

In FIGS. 6 and 7 which will be referenced hereinafter, idle virtual resources not occupied by the applications 8a–8c (e.g., the display right in the case of the operation and display panel) are indicated by phantom lines, while busy virtual resources occupied arc indicated by solid lines.

FIG. 6 demonstrates an interleave procedure between the copier application 8a and the printer application by way of example. As shown, the copier application 8a has the right to use all the resources, i.e., operation and display panel 3, image forming device 5 and image reading is device 1 and executing a copy procedure. Assume that the printer application 8b requests the system control layer to use only the image forming device 5, and that an interleave mode is available based on the user-oriented setting. Then, the system control layer controls the image forming device 5 on a time division allocation basis. By the time division allocation control, the resources is right to use the dynamically handed over among the applications 8a–8c. As a result, a sheet (copy) produced by the image forming device 5 under the control of the copier application 8a and a sheet (printing) produced by the device 5 under the control of the printer application 8b are continuously driven out to the sorter 7. Hence, the image forming device 5 operates without interruption for thereby minimizing the waiting time of the applications 8a and 8b.

The printer application 8b and FAX application 8c may operate in parallel, as shown in FIG. 7. As shown, the FAX application 8c uses the operation and display panel 3 and image reading device 5 when transmitting facsimile data, while the print application 8b needs only the image forming device 5. In this condition, requests for the resources from the applications 8b and 8c do not conflict at all. The system control layer, therefore, does not have to execute exclusive control or time division allocation control, i.e., it can accept the requests from the applications 8b and 8c at the same time. As a result, the transmission of facsimile data and the print-out of image data are executed at the same time.

Figure 8:
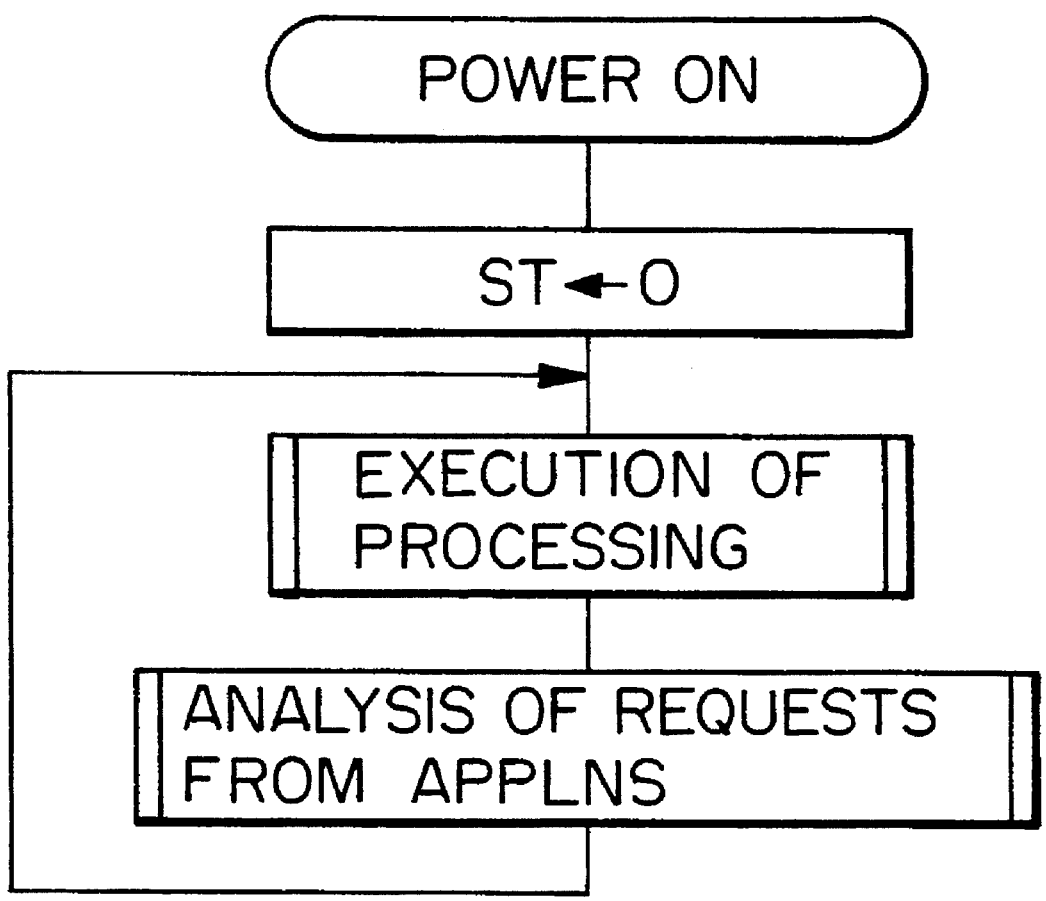
FIG. 8 is a flowchart representing a main routine with which the system control layer controls the entire system.

Hereinafter will be described part of the control over the digital copier to which the present invention pertains. FIG. 8 shows a main routine assigned to the system control layer of FIG. 2. As shown, the main routine starts up when a power source is turned on. The system control layer clears, or resets, a flag ST indicative of whether or not the duplex unit 6 is usable. Subsequently, the system control layer repeats a sequence of steps including a step of analyzing the requests from the applications.

Figure 9:
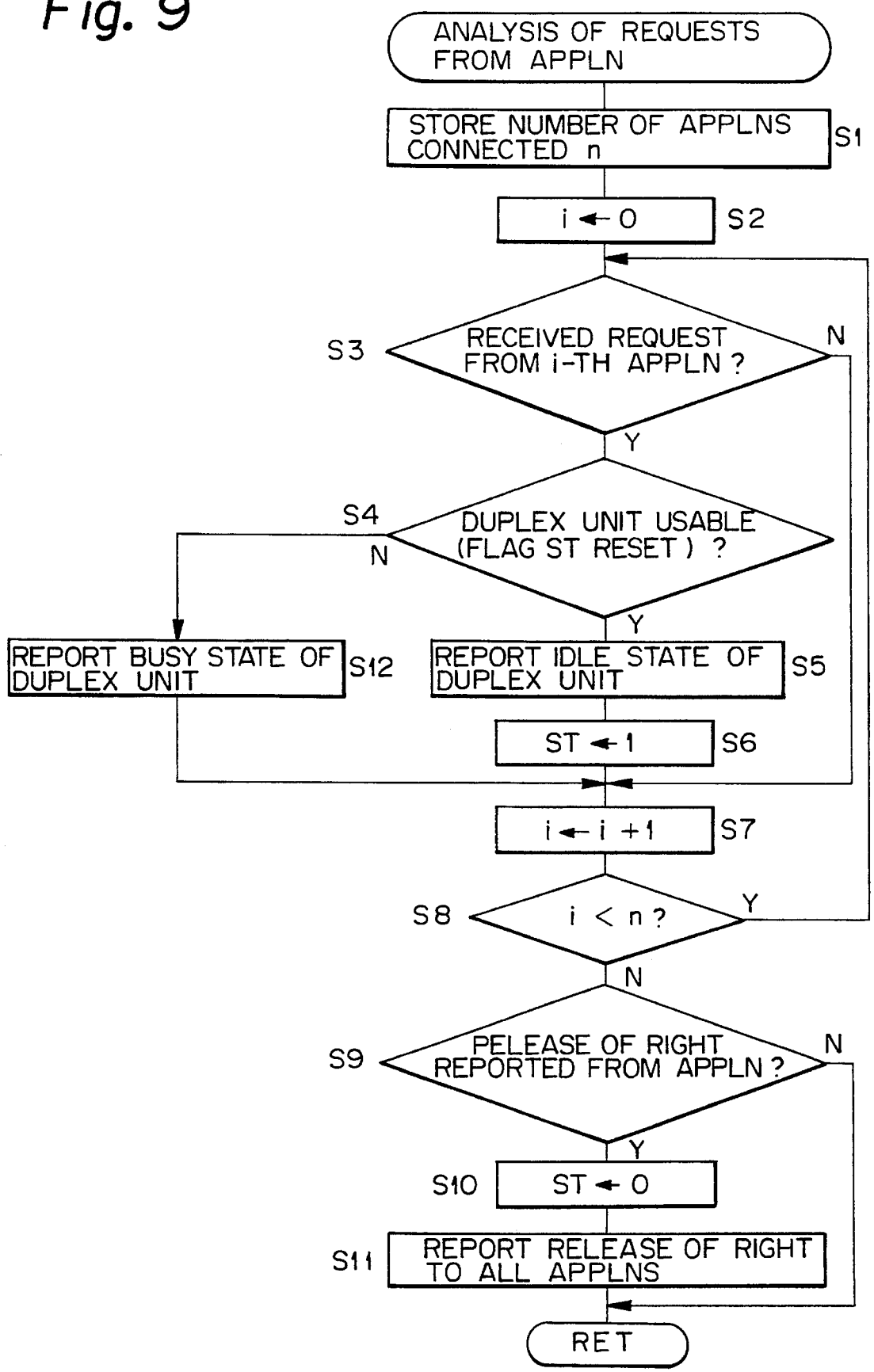
FIG. 9 is a flowchart demonstrating a procedure for analyzing requests from applications.

The subroutine for analyzing the requests from the applications included in FIG. 8 is shown in FIG. 9 in detail. As shown, the system control layer determines the number of applications n connected thereto and then writes it in a memory, not shown, (step S1). Subsequently, the system control layer resets the count i of an application counter, not shown, to zero (step S2). In this condition, the system control layer determines whether or not the i-th application has sent a request for the duplex unit 6 thereto (step S3). If the answer of the step S3 is negative, N, the program jumps to a step S7 for incrementing the count i of the application counter by 1 (one). If the answer of the step S3 is positive, Y, the system control layer determines whether or not the duplex unit 6 is usable or idle. i.e., whether or not the flag ST is reset (step S4). If the unit 6 is busy, or not usable, if the flag ST is set, the system control layer informs the i-th application sent the request of the fact that the unit 6 is busy (step S12), and then it advances to the step S7.

If the duplex unit 6 is idle as indicated by the flag ST, the system control layer informs the i-th application sent the request of the fact that the unit 6 is usable (step S5), sets the flag ST (step S6), and then increments the count i of the application counter by 1 (step S7). Subsequently, the system control layer compares the resulting count i with the stored number of applications n to see if the former is smaller than the latter (step S8). If the count i is smaller than the number n, the program returns to the step S3. On the other hand, if i is greater than or equal to n (N, step S8), the system control layer determines whether or not the application using the duplex unit 6 has released the right to use it (step S9). If the answer of the step S9 is negative, N, the program simply returns to the main routine of FIG. 8. If the answer of the step S9 is positive, Y, the system control layer resets the flag ST (step S10), informs all the applications of the release of the right to use the duplex unit 6 (step S11), and then returns to the main routine.

Figure 10A:
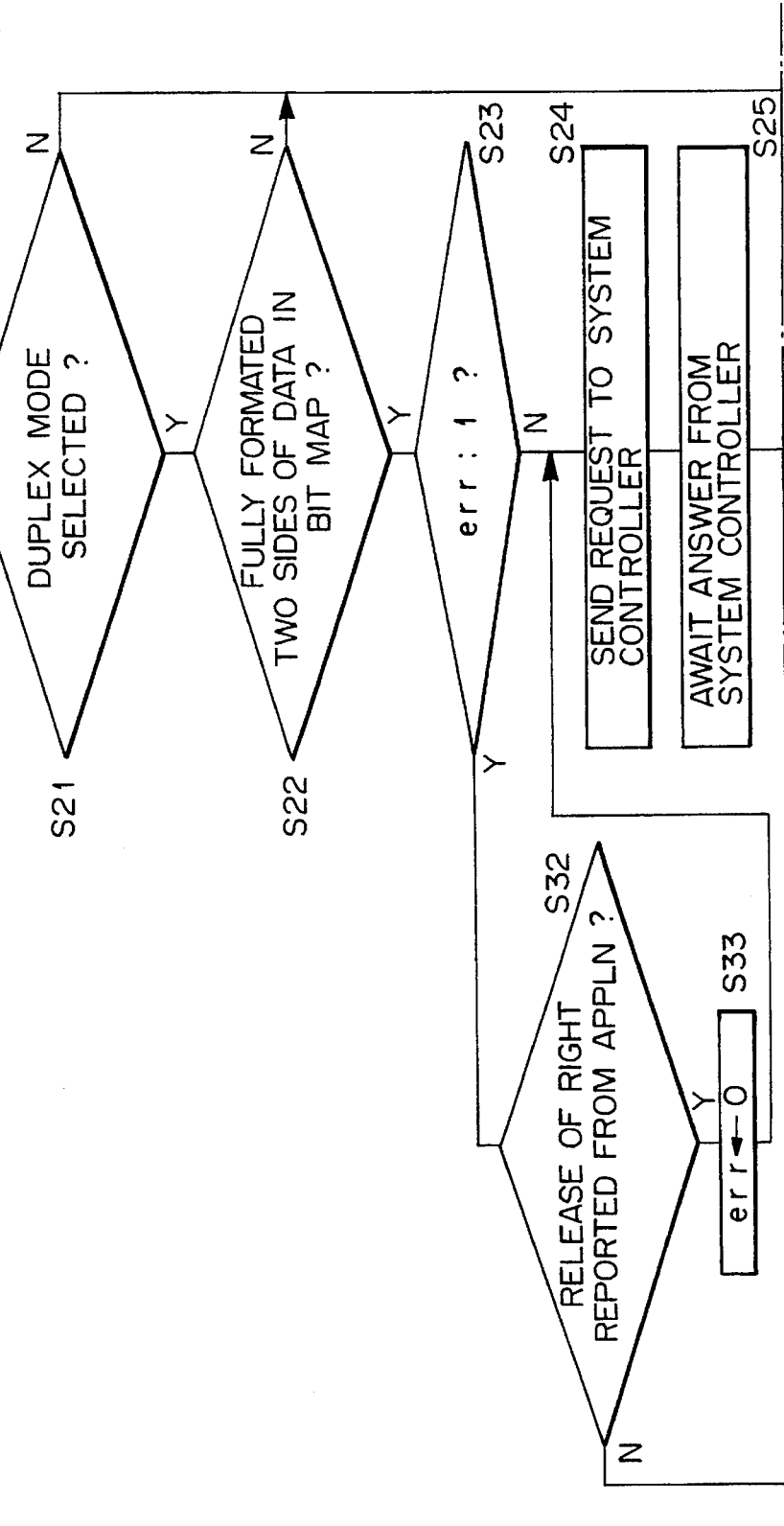
FIG. 10 is a flowchart indicative of a check routine which a printer application shown in FIG. 2 executes as the right to use a duplex unit.
Figure 10B:
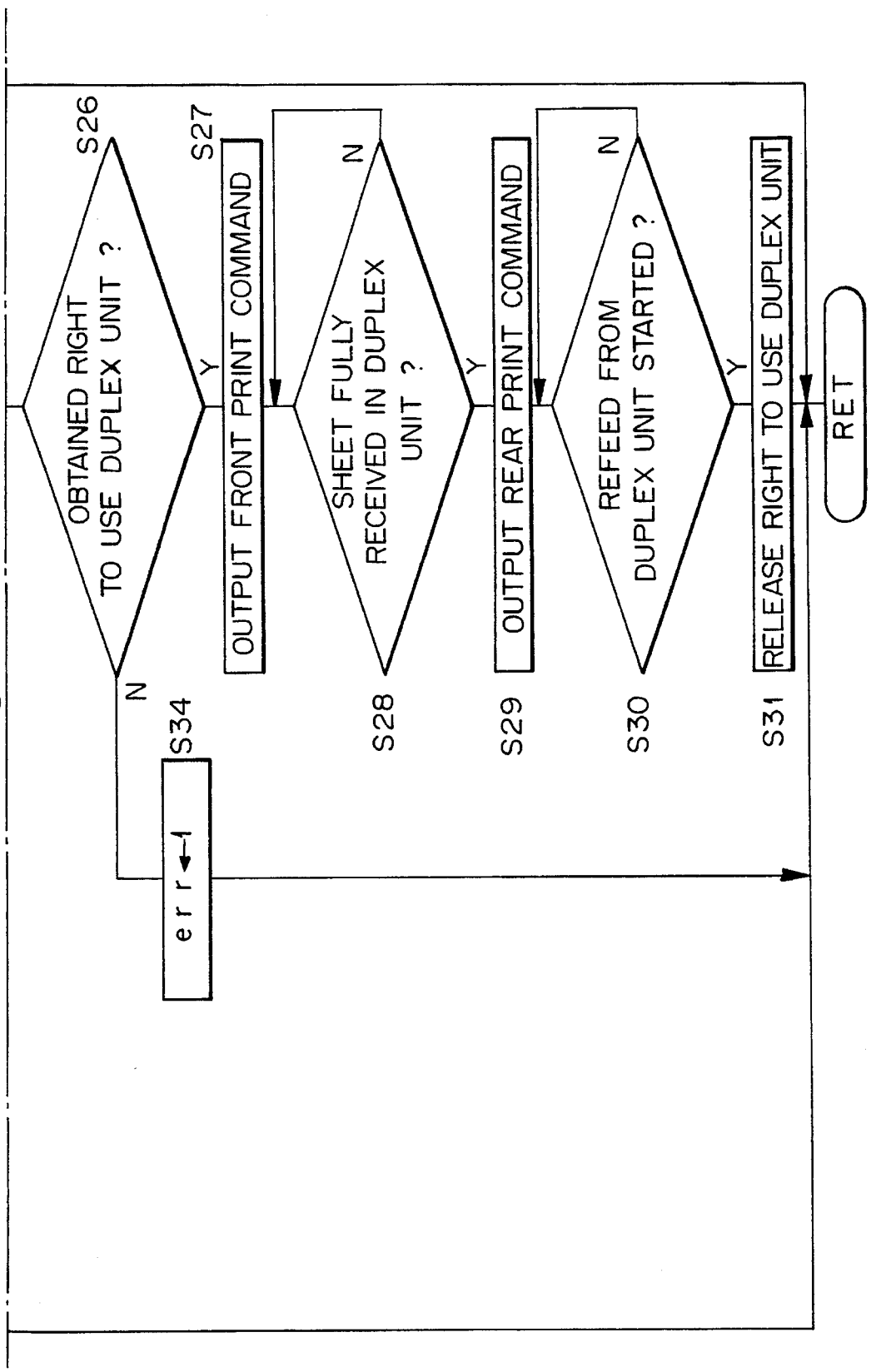

FIG. 10 shows a check routine which the printer application 8b, FIG. 2, executes for acquiring the duplex unit 6. This routine starts up when called by a main routine, not shown. To begin with, the application 8b determines whether or not a duplex mode is selected (step S21) and, if it is not selected (N, step S21), returns to the main routine. If the duplex mode is selected (Y, step S21), the application 8b determines whether or not all the image data to be printed out on both sides of a sheet have been formated in a bit map (step S22). If the answer of the step S22 is negative, N, the program returns to the main routine. If the answer of the step S22 is positive, Y, the application 8b determines whether or not an error flag ERR is set (step S23); the flag ERR indicates that the duplex unit 6 is occupied when set. If the error flag ERR is set (Y, step S23), the application 8b determines whether or not it has been informed of the fact that the application using the unit 6 has released the right to use it (step S32). If the answer of the step S32 is negative, N, the application 8b returns to the main routine; if otherwise, it resets the error flag ERR and then advances to a step S24.

If the error flag ERR is not set (N, step S23), the application 8b sends a request for the duplex unit 6 to the system control layer (system controller 11) (step S24), awaits a result of decision from the system control layer (step S25), and then determines whether or not it has obtained the right to use the unit 6 (step S26).

If the answer of the step S26 is negative, N, the application 8b sets the error flag ERR (step S34) and then returns to the main routine. If the answer of the step S26 is positive, Y, the application 8b sends a front print command to the system control layer (step S27). As a result, a sheet is fed from any one of the cassettes 4a–4c. FIG. 1, to the image forming device 5, and image data are output on the front of the sheet.

Subsequently, the application 8b determines whether or not the sheet carrying the image on one side, or front, thereof has been fully received in the duplex unit 6 (step S28). If the answer of the step S28 is positive, Y, the application 8b sends a rear print command to the system control layer (step S29). As a result, the sheet is again fed from the duplex unit 6 to the image forming device 5, and image data are output on the rear of the same sheet. Specifically, the application 8b determines whether or not the refeed of the sheet from the unit 6 to the device 5 has begun (step S30). If the answer of the step S30 is positive, Y, the application 8b releases the right to use the unit 6 and then returns to the main routine.

FIG. 11 shows a check routine which the copier application 8a, FIG. 2, executes for acquiring the duplex unit 6. This routine also starts up when called by a main routine, not shown. As shown, the application 8a determines whether or not a key input is present, i.e., whether or not a duplex mode key is operated (step S41). If the answer of the step S41 is positive, Y, the application 8a determines whether a duplex mode is selected or cleared (step S42). If the duplex mode is selected as determined in the step S42, the application 8a sends a request for the duplex unit 6 to the system control layer (step S43) and awaits an answer from the system control layer (step S44). Then, the application 8a determines whether or not the right to use the duplex unit 6 is granted thereto (step S45). If the answer of the step S45 is positive, Y, the application 8a resets the error flag ERR (step S46), reports the system control layer that it can use the unit 6 (step S47), cause an LED built in the copy start key of the operation and display panel 3 to glow in green, and then returns to the main routine. The LED glowing in green shows the user that the copier is ready to produce copies.

If the application 8a has failed to obtain the right to use the duplex unit 6 (N, step S45), the application 8a sets the error flag ERR (step S48), reports the system control layer that it cannot use the unit 6 (step S49), and then causes the LED of the copy start key to glow in red. The LED glowing in red indicates that the copier function is not accessible. Subsequently, the application 8a sends a message indicative of the busy state of the unit 6 (step S50). As a result, an inhibition message, e.g., "Duplex copy is not available" appears on a character train display portion included in the operation and display panel 3. Finally, the application 8a returns to the main routine.

If a key input is absent as determined in the step S41, the application 8a determines whether or not the error flag ERR is set (step S54) and, if it is not set, returns to the main routine. If the flag ERR is set (Y, step S54), the application 8a determines whether or not the release of the right to use the duplex unit 6 has been reported thereto (step S55). If the answer of the step S55 is negative, N, the application returns to the main routine; if otherwise, it returns to the step S43. Further, when the duplex copy mode is cleared as determined in the step S42, the application 8a determines whether or not the error flag ERR is set (step S51) and, if it is not set (ready to copy), returns to the main routine. However, if the flag ERR is set (copy inhibited) (Y, step S51), the application 8a resets it (step S52), reports the ready-to-copy state to the system control layer (step S53), causes the LED of the copy start key to glow in green, and then returns to the main routine.

As stated above, when the printer application 8b has fully formatted image data to be output on opposite sides of a sheet in a bit map, it sends a request for the duplex unit 6 to the system control layer including the system controller 11. Subsequently, when the unit 6 starts refeeding the sheet turned over to the image forming device 5, the application 8b releases the right to use the unit 6. It is to be noted that a substantial period of time is necessary for image data received from a host To be fully formed in a bit map.

As soon as the duplex mode is selected on the operation and display panel 3, the copier application 8a sends a request for the duplex unit 6 to the system control layer. Therefore, when the user needs the duplex copy mode immediately while duplex printing is under way, the application 8a can occupy the unit 6 during the interval between the beginning of the refeed of the sheet for rear printing and the end of the bit-mapping of image data to be output out on both sides of the next sheet.

If the right to use the duplex unit 6 has been granted to one application when another application sends a request for the unit 6, the system control layer informs the application sent the request of the fact that the unit 6 is busy. If the right to use the unit 6 is released, the system control layer informs the application sent the request of the fact that the unit 6 is idle. When the system control layer receives a request for the unit 6 from a plurality of applications at the same time, it grants the right to use it on a first-come-first-served basis.

When the copier application 8a has failed to obtain the right to use the unit 6 despite that the duplex copy mode has been selected, the application 8a inhibits the copy mode from being set up and causes an inhibition message to appear on the operation and display panel 3. Further, when the duplex copy mode is cleared in such a copy inhibition state, the application 8a restores the ready-to-copy condition.

When the copier application 8a, sent a request for the unit 6 to the system control layer, cannot obtain the right, it again sends the request when the application occupying the unit 6 releases the right.

In summary, it will be seen that the present invention provides an image various forming system having various unprecedented advantages, as enumerated below.

(1) An application for executing a page printer function does not send a request for a duplex unit to a system controller unit1 it fully formats image data to be output on both sides of a sheet in a bit map. Hence, even after duplex printing has begun, the right to use the duplex unit can be granted to another application until the application in charge of the page printer function fully formats image data in a bit map. This reduces the conflict between applications as to the right to use the duplex unit.

(2) Assume that the application in charge of the page printer function releases the right to use the duplex unit when a sheet turned over by the unit begins to be refed to an image forming device. Then, another application can send a request For the duplex unit in the middle of duplex printing (rear printing). This further reduces the conflict between applications.

(3) In light of the above, assume that an application to which a copier function is assigned requests the system controller for the duplex unit as soon as a duplex copy mode is selected on an operation and display panel. Then, even when the application in charge of the page printer function is effecting duplex printing, the application in charge of the copier Function can obtain the right to use the unit during the interval between the beginning of refeed For rear printing and the end of the next bit-mapping, thereby producing a duplex copy.

(4) Assume that the right to use the duplex unit has been granted to one application when another application sends a request for the duplex unit to the system controller. Then, the system controller reports the application sent the request that the duplex unit is busy. When the right is released, the system controller reports the application of interest that the duplex unit is idle.

(5) When the system controller receives a request for the duplex unit from a plurality of applications at the same time, it grants the right to use the unit on a first-come-first-served basis.

(6) When the application in charge of the copying function has failed to obtain the right to use the duplex unit despite that a duplex copy mode has been selected, it inhibits the copy mode from being set up and causes an inhibition message to appear on an operation and display panel.

(7) Further, when the duplex copy mode is cleared in such a copy inhibition state, the application restores a ready-to-copy condition.

(8) When the application in charge of the copier function and sent a request for the duplex unit to the system controller cannot obtain the right, it again sends the request when the application occupying the unit releases the right.

Various modifications will become possible for those skilled in the art after receiving the teachings of the present disclosure without departing from the scope thereof.

What is claimed is:

1. An image forming system comprising:

an image reading device for reading a document image;

an image forming device for outputting, in a bit map format, image data from said image reading device or image data from a host:

a duplex device for turning over a sheet carrying an image formed by said image forming device on one side thereof, and for refeeding said sheet to said image forming device in order to form an image on the other side thereof;

a system controller For controlling a plurality of applications which respectively execute particular functions, including at least a page printer function and a copier function, by suitably combining said image reading device, said image forming device, and said duplex device, and for controlling said image reading device, said image forming device and said duplex device in response to requests from said plurality of applications; and requesting means for requesting of said system controller a right to use said duplex device when the application in charge of the page printer function has fully formatted the image data to be output on both sides of the sheet in a bit map.

2. A system as claimed in claim 1, wherein said application in charge of the page printer function comprises releasing means for releasing the right to use said duplex device when the sheet turned over by said duplex device begins to be refed to said image forming device.

3. A system as claimed in claim 1, wherein the application in charge of the copier function comprises requesting means for requesting, when a duplex mode is selected on an operation and display panel, said system controller to grant the right to use said duplex device to said application.

4. A system as claimed in claim 3, wherein said application in charge of the copier function comprises outputting means for setting up, when failed to obtain the right to use said duplex device despite the duplex mode selected on said operation and display panel, a inhibition condition wherein a copy mode is inhibited and an inhibition message appears on said operation and display panel.

5. A system as claimed in claim 4, further comprising restoring means for restoring, when the duplex mode selected is cleared in said inhibition condition, a condition wherein the copy mode is allowed.

6. A claimed in claim 3, wherein when said application in charge of the copier function and requested said system controller to grant the right to use said duplex device fails to obtain the right, said application again requests said system control for when another application occupying said duplex device releases the right.

7. A system as claimed in claim 1, wherein said system controller comprises reporting means for reporting, when one of said plurality of applications has the right to use said duplex unit, another application sent a request for said duplex device that said duplex unit is busy or reporting, when the right to use said duplex unit is released, said another application unit that said duplex device is idle.

8. A system as claimed in claim 1, wherein said system controller comprises means for granting, when said plurality of applications request said system controller to grant the right to use said duplex unit, the right to said plurality of applications on a first-come-first-served basis.

* * * * *